Patented June 11, 1929.

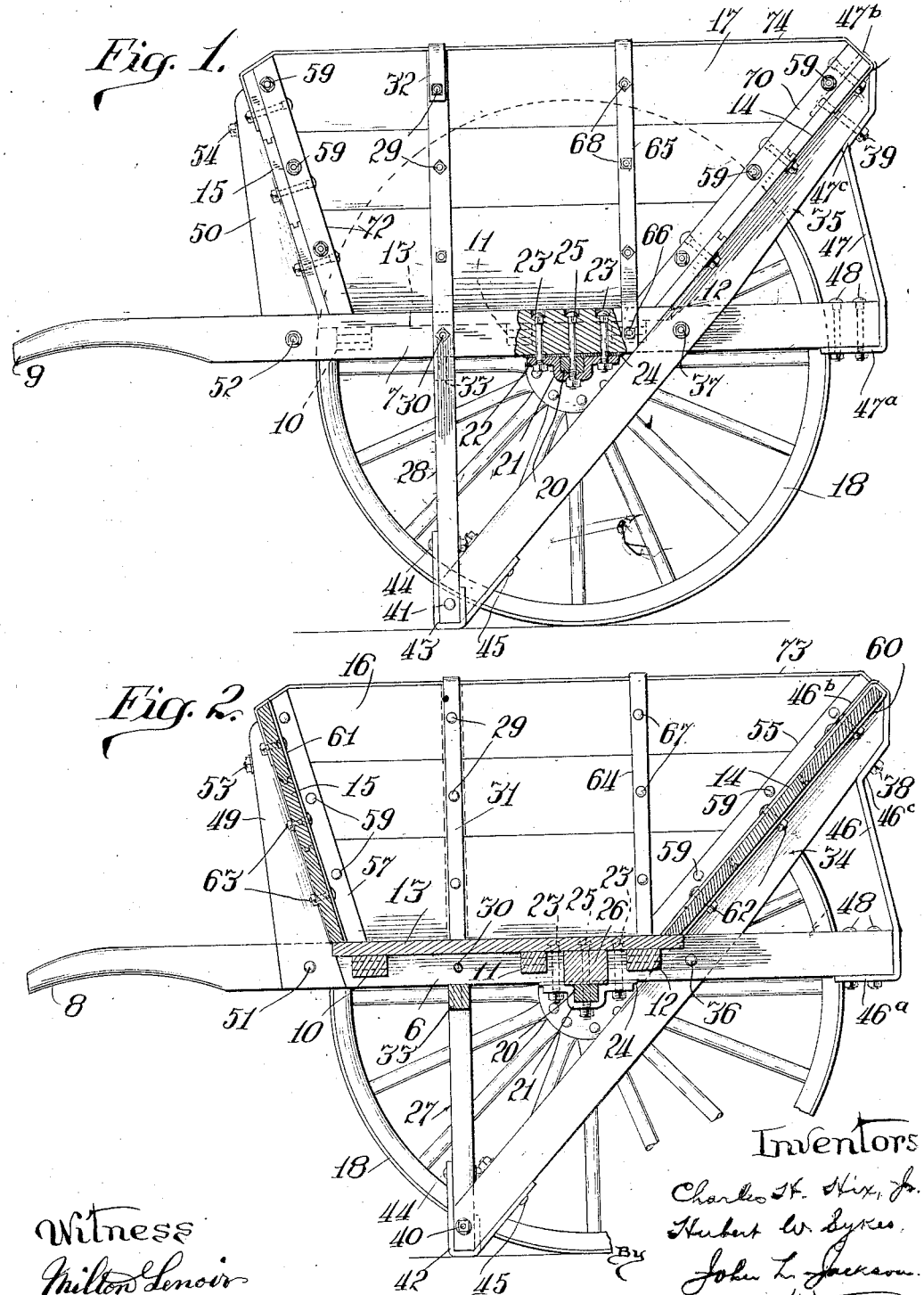

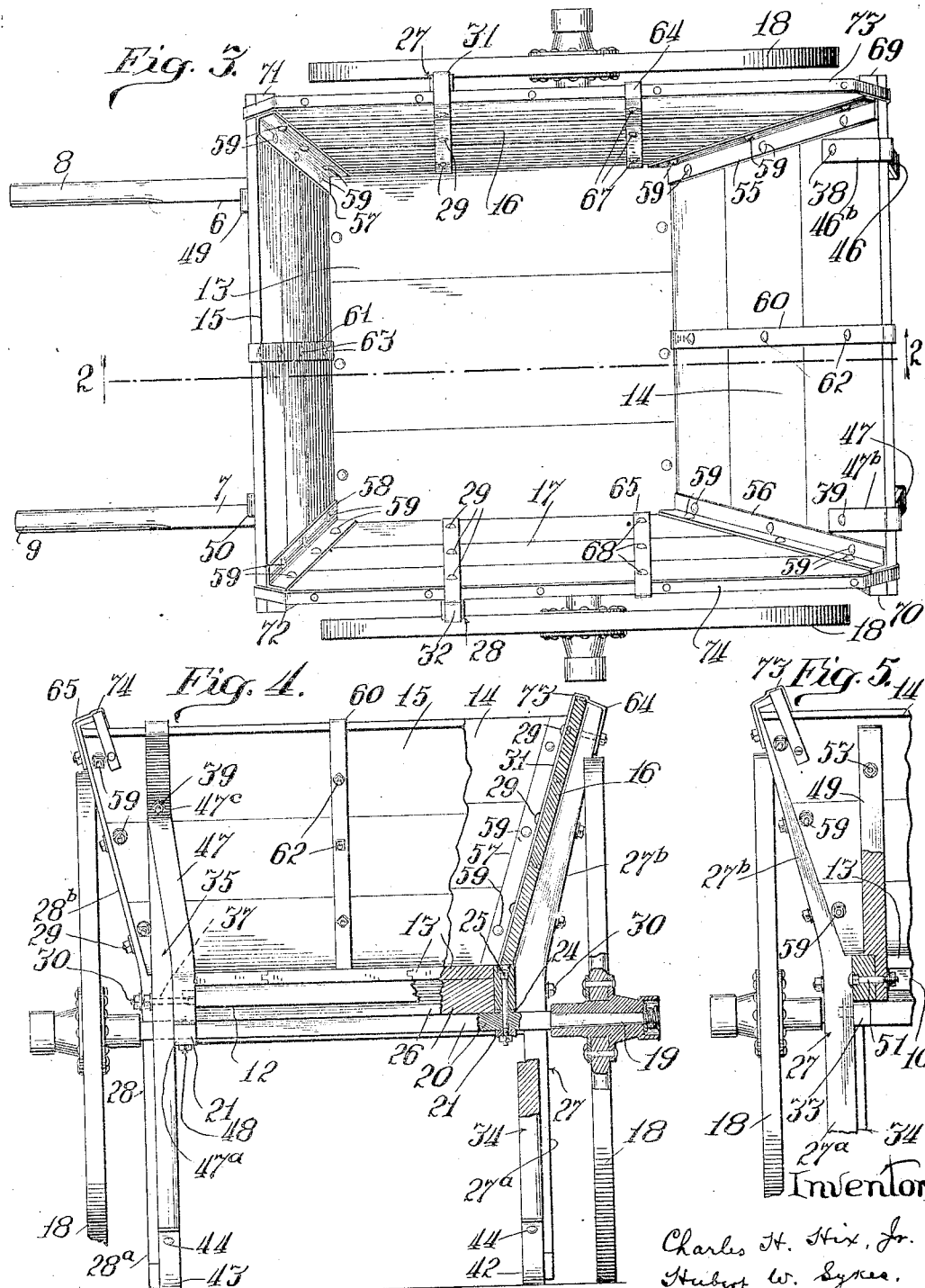

1,716,636

UNITED STATES PATENT OFFICE.

CHARLES H. HIX, JR., OF NORFOLK, AND HUBERT W. SYKES, OF PORTSMOUTH, VIRGINIA, ASSIGNORS TO R. W. WHITEHURST MANUFACTURING CORPORATION, OF NORFOLK, VIRGINIA, A CORPORATION OF VIRGINIA.

CART.

Application filed November 3, 1926. Serial No. 145,930.

Our invention relates to two-wheeled hand carts such as are commonly used for the transportation of materials of various kinds, and which are designed to be tilted to discharge the load at the front of the cart. Such carts usually comprise a body portion or bed having flaring sides and ends, which is mounted on wheels of comparatively large diameter, a pair of handles being provided at the rear by which the operator may move the cart from place to place and tilt it to discharge its load. Legs are also provided at each side to support the cart with its bed in loading position, such legs being arranged to engage the ground at a point back of the axis of the wheels and approximately under the center of gravity of the load when the bed is in loading position, at which time its bottom is approximately horizontal. Carts of this general design are well known, and our invention has to do more particularly with improved features of construction having for their object the making of the body and framework of the cart strong and rigid so that it will withstand the rough usage that such carts are usually subjected to, particularly when the load is being dumped. Other more specific objects of our invention are to provide a construction which will keep the top board of the end of the bed from splitting and being knocked off when dumping in piles of material or on rough places on the floor; to protect the frame from injury, especially in dumping; to facilitate dumping over raised places on the floor, such as the tops of hoppers, &c., and to improve the construction of carts of this type in various other respects that will be hereinafter pointed out. We accomplish our objects as illustrated in the drawings and as hereinafter described. What we regard as new is set forth in the claims.

In the accompanying drawings,—

Fig 1 is a side elevation of our improved cart, part of one of the side bars of the frame, and the axle, being shown in section;

Fig. 2 is a longitudinal vertical section on line 2—2 of Fig. 3;

Fig. 3 is a plan view;

Fig. 4 is principally a front elevation, certain parts at one side of the cart being shown in vertical cross-section; and Fig. 5 is a partial front view with some parts in vertical cross-section.

Our improved cart comprises a frame made up in part of two parallel side bars 6, 7 spaced apart a distance substantially equal to the width of the bottom of the bed of the cart and shaped at their rear ends to form handles 8, 9 by which the cart may be conveniently manipulated, these side bars being held in fixed relation to each other by a plurality of cross bars, preferably three in number, as shown at 10, 11 and 12 in Fig. 2. These cross bars are preferably provided with tenons at their ends fitted in mortises in the side bars 6, 7, as indicated by dotted lines in Figs. 1 and 2. Fitted between the side bars 6, 7 and secured upon the cross bars 10, 11 and 12 is the bottom 13 of a bed or body, the front and rear margins of the bottom terminating a considerable distance from the front and rear ends of the side bars, as shown in Fig. 2.

Extending upward from the front and rear marginal portions of the bottom 13 are inclined front and rear end boards 14, 15, and extending upwardly from the side marginal portions of the bottom are inclined side boards 16, 17. These side and end boards, which when made of wood are composed of any suitable number of tongued and grooved pieces, securely fastened together, join at the corners of the bed and are firmly braced, as will be hereinafter described, so that with the bottom they form a hopper-like receptacle, the walls of which flare upwardly. Preferably the front wall is inclined somewhat more sharply than the rear and side walls, to facilitate dumping, as best shown in Fig. 2.

The side bars 6, 7 and the bed mounted thereon are supported on two wheels 18 which are mounted on spindles 19 at the opposite ends of a transverse axle 20 in the form of a metal bar that extends under and is secured to the side bars 6, 7, as best shown in Figs. 1 and 4. For securing the end portions of the axle to the bars 6, 7, respectively, boxes or stirrups 21 are provided that fit over the axle from below and are provided with flat end portions 22 that lie parallel with the under surfaces of the side bars 6, 7 and are secured thereto by bolts 23. Between the end portions 22 and the under surfaces of the bars 6, 7 plates 24 are provided to keep the axle from wearing into the side bars 6, 7, as best shown in Fig. 1. Bolts 25 are also provided that extend through the side bars, the plates 24, the axle 21 and the stirrups 25, thereby clamping all such parts tightly together. Also, to make the bottom 13 more rigid, a transversely disposed filler block 26 is provided between the upper surface of the axle and the under surface of the bottom, as best shown in Figs. 2 and 4.

The cart is supported in its normal or loading position by legs 27, 28 at opposite sides thereof, and placed a short distance back of the axle 20, as best shown in Figs. 1 and 2. These legs are in the form of bars, the lower portions of which are vertically disposed, as shown at 27$^a$, 28$^a$ in Fig. 4, while their upper portions incline outwardly, as shown at 27$^b$, 28$^b$, to conform to the flare of the side boards 16, 17, against which they fit and to which they are secured by bolts 29. The legs 27, 28 are also secured to the side bars 6, 7 by a through bolt 30 that extends across the frame and through the two legs and side bars, as illustrated in Figs. 1 and 2. To further secure the side boards to the legs metal straps 31, 32 are provided that extend across the side boards, respectively, from their lower margins up over their upper margins, and overlap the upper end portions of the legs, as best shown in Figs. 1 and 4, and are secured thereto by the bolts 29. These straps reenforce the side boards and prevent splitting thereof, and they also prevent the side boards from becoming loose from the cart, and increase the rigidity of the structure.

The legs 27, 28 are further braced by a brace 33 that extends across between said legs immediately under the side bars 6, 7, against which it bears, said brace being preferably united with the legs by providing its ends with tenons that are mortised in the legs, as indicated in Figs. 1 and 2.

To firmly support the front end board 14, and also to further brace the lower ends of the legs 27, 28, inclined braces 34, 35 are provided, in the form of bars secured intermediately of their ends to the side bars 6, 7, respectively, by bolts 36, 37. The upper end portions of said braces are secured to the upper end portions of the front end board 14 by bolts 38, 39, while their lower ends overlap the lower ends of the legs 27, 28 and are secured thereto by bolts 40, 41. They are also secured to the legs by shoes 42, 43 in the form of unitary metal straps that overlap the adjoining end portions of said legs and braces, said straps being secured by bolts 44, 45, as best shown in Figs. 1 and 2.

The upper end portions of the braces 34, 35 are braced from the front ends of the side bars 6, 7 by strong metal straps 46, 47, the lower ends of which overlap and extend under the front end portions of said side bars, as shown at 46$^a$, 47$^a$ in Figs. 1 and 2, and are secured thereto by bolts 48. The upper end portions of the straps 46, 47 are offset so that they extend upwardly and inwardly from the front ends of the side bars 6, 7 and join the upper end portions of the braces 34, 35 some distance below the upper ends thereof. From that point they follow the contour of said braces and are lapped over the upper ends thereof and over the upper edge of the front end board 14, as shown at 46$^b$, 47$^b$ in Fig. 3. The upper ends of the straps 46, 47 are connected with the braces 34, 35, respectively, and with the front end board by the bolts 38, 39. These metal braces serve to rigidly connect the braces 34, 35 with the side bars 6, 7, and thereby not only firmly support the front end board 14, but they also contribute to the rigidity of the legs 27, 28 and of the frame structure as a whole. The braces 46, 47 also protect the ends of the side bars 6, 7 and the body against hard knocks when dumping the cart, and they tie down the front end board and keep it from splitting or being otherwise damaged when dumping in piles of material or rough places on the floor. By providing the offset portions 46$^c$, 47$^c$, indicated in Figs. 1 and 2, said braces do not interfere with dumping the cart over raised places in the floor, such as the tops of hoppers, &c.

The rear end board 15 is braced and strongly supported from the side bars 6, 7 by braces 49, 50 in the form of bars which at their lower ends are cut away to form overlapping joint connections with said side bars, as best shown in Fig. 5, said braces being secured to the side bars by bolts 51, 52. From the side bars said braces extend upwardly and slightly rearwardly to conform to the inclination of the rear end board, against which they bear, and to which they are secured adjacent to their upper ends by bolts 53, 54.

In addition to the parts already described for supporting and bracing the side and end boards of the bed, they are further united and braced by angle iron braces 55, 56, 57, 58 placed in the four corners where the side and end boards meet, so that they cover the inner angles formed by the juncture thereof, as best shown in Fig. 3. These angle iron braces extend from the bottom of the bed up to the upper margins of the side and end boards, to which they are secured by bolts 59. They, therefore, reenforce the side and end boards, which are usually made up of a number of pieces joined together, and prevent them from splitting, besides uniting them to form a very rigid and substantial structure. The end boards are further reenforced by metal straps 60, 61, respectively, placed intermediately of the length thereof, as shown in Fig. 3, which straps extend over both the inner and outer surfaces of said end boards and are secured thereto by bolts 62, 63.

Similar metal straps 64, 65 are provided for the side boards, preferably midway between the straps 31, 32 and the front ends of said side boards, as best shown in Fig. 3. The straps 64, 65 also extend over the inner and outer surfaces of the side boards and their outer lower ends overlap and are secured to the side bars 6, 7 by bolts 66, as shown in Fig. 1. Bolts 67, 68 serve to secure said straps to the side boards respectively.

As best shown in Fig. 3, the end boards extend slightly beyond the side boards, and battens 69, 70, 71, 72 are provided in the outer angles formed by such projecting portions, to strengthen the connections between the side and end boards and increase the rigidity of the structure. These battens are secured to the end and side boards by the bolts 59 that secure the several angle iron braces thereto.

To protect the upper margins of the side boards and also further strengthen them, metal straps 73, 74 are provided that extend longitudinally of said side boards and at their ends overlap the end boards, as shown in Figs. 1 and 2. These straps preferably pass under the straps 31, 64, and 32, 65, as illustrated in Fig. 3, and also in Fig. 4.

In using the cart of our invention the hopper or bed is tilted preferably while the cart is standing as shown in Fig. 1. The handles 8, 9 are carried conveniently high enough by the wheels 18 that the operator grasping the handles and standing erect raises the rear end of the cart slightly, that is, raising the legs 27, 28 off of the ground and thereby shifting the center of gravity of the bed and its load substantially directly over the axle so that the cart is easily moved. The loaded cart is then wheeled to the place where the material is to be deposited and the cart is then dumped by throwing the handles 8 upwardly until the ends of the side bars strike the ground or floor, whereupon the ends of the side bars which are substantially parallel with the bearing of the wheels on the floor act as a fulcrum over which the entire cart is tilted until the forward edge of the bed or body or the forward ends of the diagonal braces 34 engage the floor or ground, stopping further tilting of the cart without danger of the cart tipping over forwardly out of the control of the operator. It will be observed upon a study of the construction of the cart that with the boards arranged in horizontal fashion with the bolts running through the centers of the boards and through transverse braces, such striking of the ground with the ends of the side bars while the body is still loaded tends to rack the body or bed because of its pin-jointed construction. The braces 46, 47 it will be observed are bolted transversely of the other pin joints and, hence, in addition to the direct bracing, are further effective because of the manner in which they are applied, and this manner of application also provides protecting shoes for the ends of the side bars and diagonal braces 34.

By the construction described we provide a very strong cart that is capable of withstanding rough usage without injury, and which may be handled very easily both in the transportation and dumping of the load. The legs that support the cart when in loading position are placed far enough back of the axle so that the cart is stable, but the disposition of the bed with respect to the axle enables the operator to tilt it easily sufficiently to wheel the load, and to dump it without much effort. Bolts are preferably used in assembling the several parts, for convenience in collapsing the body for shipment in a knock-down condition, and for quick assembly, but if desired rivets may be used. Also, it should be understood that while some of the bracing devices described are intended primarily for carts with bodies made of wood, several of the features of improvement above pointed out may be advantageously applied to carts principally made of metal, and, therefore, the claims hereinafter made should be construed accordingly. The braces hereinbefore referred to as being made of angle iron may, of course, be made of steel or other suitable material, and instead of using wooden battens in the outer angles at the corners of the bed metal angles may be employed. In other respects also our invention is not limited to the specific construction shown and described except in so far as covered by specific claims, but includes such modifications or variations thereof as will occur to those skilled in the art.

What we claim as our invention and desire to secure by Letters Patent, is—

1. In a cart, the combination with a bed having a forwardly inclined front wall, of side bars supporting said bed and extending forward of the bottom thereof, braces extending upward from the forward end portions of the side bars and secured to the upper portion of said front wall, wheels mounted intermediately on said side bars at opposite sides of the cart, legs secured to the side bars back of the axis of said wheels, and braces connecting the lower portions of said legs with the side bars forward of said axis and back of the front ends of said side bars, said latter braces extending upward in front of and supporting said front wall, the forward edge of the bed and the forward ends of the side bars terminating forward of the rims of the wheels whereby the cart may be tilted to dumping position over the ends of the side bars as a fulcrum and may rest with the front edge of the bed on the floor.

2. In a cart, the combination with a bed having a forwardly inclined front wall, of side bars supporting said bed and extending forward of the bottom thereof, wheels mounted intermediately on said side bars at opposite sides of the cart, inclined braces secured to said side bars forward of the axis of said wheels and back of the front ends of the side bars, and extending upward in front of and supporting said front wall, and braces secured to the front end portions of said side bars and to the upper end portions of said inclined braces, the forward edge of the bed and the forward ends of the side bars terminating a short distance beyond the rims of the wheels, the ends of the side bars serving as a fulcrum over which the cart may be tilted to dump the same, the forward part of the bed being adapted to engage the floor to prevent the cart from tipping over forwardly while being dumped.

3. In a cart, the combination with a bed having a forwardly inclined front wall, of side bars supporting said bed and extending forward of the bottom thereof, wheels mounted intermediately on said side bars at opposite sides of the cart, inclined braces secured to said side bars forward of the axis of said wheels and back of the front ends of the side bars, and extending upward in front of and supporting said front wall, and braces secured to the front end portions of said side bars and extending upward over the upper end portions of said inclined braces and the upper part of said front wall, and secured to said inclined braces and wall, the forward ends of said inclined braces and the forward ends of the side bars terminating a short distance forward of the rims of the wheels, the forward ends of the side bars being adapted to engage the ground and act as a fulcrum over which the cart is tilted to dump the same, the forward ends of the inclined braces with the forward edge of the bed thereafter coming into engagement with the floor to stop further tilting of the cart.

4. In a cart, the combination with a bed having a forwardly inclined front wall, of side bars supporting said bed an extending forward of the bottom thereof, wheels at opposite sides of the cart mounted intermediately on said side bars, inclined braces secured to said side bars at points back of the front ends thereof and forward of the axis of said wheels and extending upward in front of and supporting said front wall, and metal braces secured to the front end portions of said side bars and extending upward therefrom, and provided with offset portions adapted to bear against and overlap the upper end portions of said inclined braces, the forward ends of the side bars and the forward ends of said inclined braces terminating forward of the rims of the wheels, the ends of the side bars acting as a fulcrum over which the cart is tilted to dump the same, the ends of the inclined braces normally stopping the tilting movement by engaging the floor but the offset portions of said metal braces permitting the cart to be dumped over an upstanding flange.

5. In a cart, the combination with a bed having a forwardly inclined front wall, of side bars supporting said bed and extending forward of the bottom thereof, wheels supporting said side bars, inclined braces secured to said side bars forward of the axis of said wheels and extending upward in front of said front wall, metal braces secured to the front end portions of said side bars and extending upward therefrom, and provided with offset portions adapted to bear against and overlap the upper end portions of said inclined braces, the upper end portions of said metal braces being extended down over the rear surface of said front wall, and means securing said metal braces to said inclined braces and to the front wall.

6. In a cart, the combination with a bed having a forwardly inclined front wall, of side bars supporting said bed and extending forward of the bottom thereof, wheels mounted intermediately on said side bars at opposite sides of the cart, legs secured to the side bars back of the axis of said wheels, inclined braces connecting the lower portions of said legs with the side bars forward of said axis and back of the front end portions of said side bars, said braces extending upward in front of and bracing said front wall, and braces connected with the front end portions of the side bars and with the upper end portions of said inclined braces, the forward edge of the bed and the forward ends of the side bars terminating a short distance beyond the rims of the wheels, the ends of the side bars serving as a fulcrum over which the cart may be tilted to dump the same, the forward part of the bed being adapted to engage the floor to prevent the cart from tipping over forwardly while being dumped.

7. In a cart, the combination with a bed having sides and a forwardly inclined front wall, of side bars supporting said bed and extending forward of the bottom thereof, wheels mounted intermediately on said side bars, legs secured to the side bars back of the axis of said wheels and having upwardly extending portions secured to the sides of the bed, inclined braces secured to the side bars forward of said axis and having upwardly extending portions secured to and bracing said front wall, and downwardly extending portions secured to the lower end portions of said legs, and braces secured to the front end portions of said side bars and to the upper end portions of said inclined braces and the front wall, the forward edge of the bed and the forward ends of the side bars terminating a short distance beyond the rims of the wheels, the ends of the side bars serving as a fulcrum over which the cart may be tilted to dump the same, the forward part of the bed being adapted to engage the floor to prevent the cart from tipping over forwardly while being dumped.

8. In a cart, the combination with a bed having sides and a forwardly inclined front wall, of side bars supporting said bed and extending forward of the bottom thereof, wheels supporting said side bars, legs secured to the side bars back of the axis of said wheels and having upwardly extending portions secured to the sides of the bed, inclined braces secured to the side bars forward of said axis and having upwardly extending portions secured to said front wall, and downwardly extending portions secured to the lower end portions of said legs, and metal braces secured to the under sides of the forward end portions of said side bars and extending upward therefrom and overlapping the upper end portions of said inclined braces and the upper end portions of said front wall.

9. In a cart, the combination with a bed having sides and a forwardly inclined front wall, of side bars supporting said bed and extending forward of the bottom thereof, wheels supporting said side bars, legs securing to the side bars back of the axis of said wheels and having upwardly extending portions secured to the sides of the bed, inclined braces secured to the side bars forward of said axis and having upwardly extending portions secured to said front wall, and downwardly extending portions secured to the lower end portions of said legs, braces secured to the front end portions of said side bars and to the upper end portions of said inclined braces, and metal shoes overlapping the lower end portions of said legs and said inclined braces.

10. In a cart, the combination with parallel side bars, transverse braces connecting said side bars below the upper margins thereof, a transverse axle secured to the under side of said side bars, wheels mounted on said axle, a bed comprising a bottom, sides and a front wall, having its bottom fitted between said side bars and resting on said transverse braces, legs secured to the side portions of the bed and to said side bars, diagonal braces secured to the lower portions of said legs and to the side bars forward of the axle, the upper portions of said diagonal braces supporting the front wall of the bed, and braces connected with the front end portions of said side bars and extending upward therefrom and secured to the upper end portions of said diagonal braces.

11. In a cart, the combination with parallel side bars, wheel spindles supported by and projecting outwardly from said side bars respectively, and wheels mounted on said spindles, of a bed mounted on said side bars, said bed comprising outwardly flared side and end boards, legs secured to the side boards and to said side bars, and strap iron braces extending upwardly across said side boards and connected with said legs.

12. In a cart, the combination with parallel side bars, wheel spindles supported by and projecting outwardly from said side bars respectively, and wheels mounted on said spindles, of a bed mounted on said side bars, said bed comprising outwardly flared side and end boards, legs secured to the side boards and to said side bars, strap iron braces extending upwardly across said side boards and connected with said legs, and inclined braces connected intermediately with said side bars, the lower end portions of said inclined braces being connected with said legs, and the upper end portions thereof extending upwardly across the front end board and being secured thereto.

13. In a cart, the combination with parallel side bars, wheel spindles supported by and projecting outwardly from said side bars respectively, and wheels mounted on said spindles, of a bed mounted on said side bars, said bed comprising outwardly flared side and end boards, legs secured to the side boards and to said side bars, strap iron braces extending upwardly across said side boards and connected with said legs, and strap iron braces connected with said side bars and extending upwardly across the outer surfaces of said side boards and downwardly across the inner surfaces thereof.

14. In a cart, the combination with parallel side bars, wheel spindles supported by and projecting outwardly from said side bars respectively, and wheels mounted on said spindles, of a bed mounted on said side bars, said bed comprising side and outwardly flared end boards, legs secured to the side boards and to said side bars, diagonal braces connected with said side bars forward of the wheel spindles, the lower portions of said braces being connected with said legs and the upper portions thereof being arranged to bear against and support the front end board, braces between the upper portions of said diagonal braces and the front end portions of said side bars, and braces connected with said side bars rearwardly of the bed and extending upwardly across and supporting the rear end board.

15. In a cart, a hopper shaped body having an inclined front wall, side bars upon which the body rests, an axle under the side bars approximately centrally of the body, wheels on the axle at each side of the body, said body being formed of boards laid edge to edge, metal straps bolted to said boards to hold them together, legs of substantially the same length as the radius of the wheels fastened to the side bars a short distance back of the axle, diagonal braces secured to the side bars a short distance in front of the axle, the lower ends of the diagonal braces being connected to the lower ends of the legs, the upper ends of the diagonal braces lying against and supporting the inclined front wall, the front ends of the side bars extending forward of the rims of the wheels to form a fulcrum over which the cart is tilted for dumping, the front ends of the diagonal braces terminating substantially flush with the front edge of the inclined front wall and braces connecting the front ends of the side bars and the front ends of the diagonal braces to prevent racking of the body, said braces comprising flat metal bars extending over the ends of the side walls and over the ends of the diagonal braces and forming protecting shoes, the dumping of the cart being accompanied by successive engagement of the floor by the ends of the side bars and the ends of the diagonal braces.

16. In a cart of the class described, substantially horizontal sills having handles at their ends, a flared hopper body thereupon comprising a bottom and side and end walls, the side and end walls being formed of boards disposed horizontally and set edge to edge, transverse connecting members for said boards, bolts passing through the boards and the members and pinning them together, a transverse axle under the central part of the body, wheels of relatively large diameter on the axle outside the sills, diagonal braces lying against and bolted to the front wall of the body and secured to the sills, the forward ends of the sills and the forward ends of the diagonal braces lying in front of the rims of the wheels, and braces between the forward ends of the sills and diagonal braces to brace the body against racking when the cart is dumped, said cart being adapted to be dumped by tilting the same over the forward ends of the sills as a fulcrum to a position when further tilting is stopped by the forward ends of the diagonal braces.

CHARLES HOLMES HIX, JR.
HUBERT W. SYKES.